(12) United States Patent
Lin et al.

(10) Patent No.: US 7,267,192 B2
(45) Date of Patent: Sep. 11, 2007

(54) MOTOR-DRIVEN VEHICLE WITH TWO VEHICLE BODIES THAT ARE INTERCONNECTED REMOVABLY

(75) Inventors: Po-Yi Lin, Chia Yi (TW); Samuel Lin, Chia Yi Hsien (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 264 days.

(21) Appl. No.: 11/156,346

(22) Filed: Jun. 16, 2005

(65) Prior Publication Data
US 2006/0283645 A1 Dec. 21, 2006

(51) Int. Cl.
*B62D 61/00* (2006.01)

(52) U.S. Cl. .................................... 180/208

(58) Field of Classification Search ............. 180/208, 180/311, 312, 908; 280/149.2, 785, 781, 280/491.2; 403/109.3, 109.6, 109.8, 377, 403/378, 379.5, 327, 329
See application file for complete search history.

(56) References Cited

U.S. PATENT DOCUMENTS

| | | | | |
|---|---|---|---|---|
| 4,397,476 A | * | 8/1983 | Bolyard et al. ............. 280/656 |
| 4,471,972 A | * | 9/1984 | Young ....................... 280/304.1 |
| 4,504,164 A | * | 3/1985 | Bien ......................... 403/109.3 |
| 5,042,831 A | * | 8/1991 | Kuhns ......................... 280/656 |
| 6,793,248 B1 | * | 9/2004 | Sung .......................... 280/781 |

\* cited by examiner

*Primary Examiner*—Paul N. Dickson
*Assistant Examiner*—Robert A. Coker
(74) *Attorney, Agent, or Firm*—Ladas & Parry LLP

(57) ABSTRACT

A motor-driven vehicle includes a first vehicle body with a sleeve tube, a second vehicle body with an insert rod disposed telescopically within the sleeve tube, and a locking device including a pull rod, a retaining block and a resilient member. The pull rod is movable on the first vehicle body between a locking position and a release position. When the pull rod is disposed at the locking position, the retaining block extends through a hole in the sleeve tube and engages a selected one of holes in the insert tube of the second vehicle body. When the pull rod is disposed at the release position, the retaining block is removed from the holes in the insert rod. The resilient member biases the pull rod to the locking position.

4 Claims, 5 Drawing Sheets

MOTOR-DRIVEN VEHICLE WITH TWO VEHICLE BODIES THAT ARE INTERCONNECTED REMOVABLY

BACKGROUND OF THE INVENTION

1. Field of the Invention

This invention relates to a motor-driven vehicle, and more particularly to a motor-driven vehicle that has two vehicle bodies, which are interconnected removably.

2. Description of the Related Art

Referring to FIGS. 1 and 2, a conventional motor-driven vehicle 1 includes a rear vehicle body 11, a front vehicle body 12, and a lock pin 13 interlocking the first and second vehicle bodies 11, 12. The rear vehicle body 11 includes a sleeve tube 111 extending horizontally and forwardly therefrom and having two aligned holes 112. The front vehicle body 12 includes a hollow insert rod 121 extending horizontally and rearwardly therefrom and disposed telescopically within the sleeve tube 111 of the rear vehicle body 11. The insert rod 121 has two aligned pairs of holes 122 spaced apart from each other. When it is desired to interconnect the first and second vehicle bodies 11, 12, the insert rod 121 is inserted into the sleeve tube 111. Subsequently, the holes 112 in the sleeve tube 111 are aligned with a selected one pair of the holes 122 in the insert rod 121 so as to allow for insertion of the lock pin 13 through the holes 112 in the sleeve tube 111 and the selected one pair of the holes 122 in the insert rod 121.

The conventional motor-driven vehicle 1 has the following disadvantages:

(1) The lock pin 13 is a separate member. Therefore, at some point during assembly, the lock pin 13 needs to be completely removed from both of first and second vehicle bodies 11, 12, thereby resulting in a troublesome operation.

(2) Because the sleeve tube 111 and the insert rod 121 are disposed respectively at middle portions of the rear and front vehicle bodies 11, 12 (i.e., "middle" with respect to a transverse direction of the sleeve tube 111), it is difficult to insert and remove the lock pin 13 into and from the holes 112, 122 in the rear and front vehicle bodies 11, 12, particularly after vehicle shells (not shown) have been assembled respectively to the rear and front vehicle bodies 11, 12.

SUMMARY OF THE INVENTION

The object of this invention is to provide a motor-driven vehicle that includes two vehicle bodies, which can be connected to and disconnected from each other with ease.

According to this invention, a motor-driven vehicle includes a first vehicle body with a sleeve tube, a second vehicle body with an insert rod disposed telescopically within the sleeve tube, and a locking device including a pull rod, a retaining block and a resilient member. The pull rod is movable on the first vehicle body between a locking position and a release position. When the pull rod is disposed at the locking position, the retaining block extends through a hole in the sleeve tube and engages a selected one of holes in the insert tube of the second vehicle body. When the pull rod is disposed at the release position, the retaining block is removed from the holes in the insert rod. The resilient member biases the pull rod to the locking position. The pull rod is attached to the first vehicle body, and thus can be operated with ease. Preferably, the pull rod has an operating portion disposed at a left or right side of the first vehicle body. This increases convenience during operation of the pull rod.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
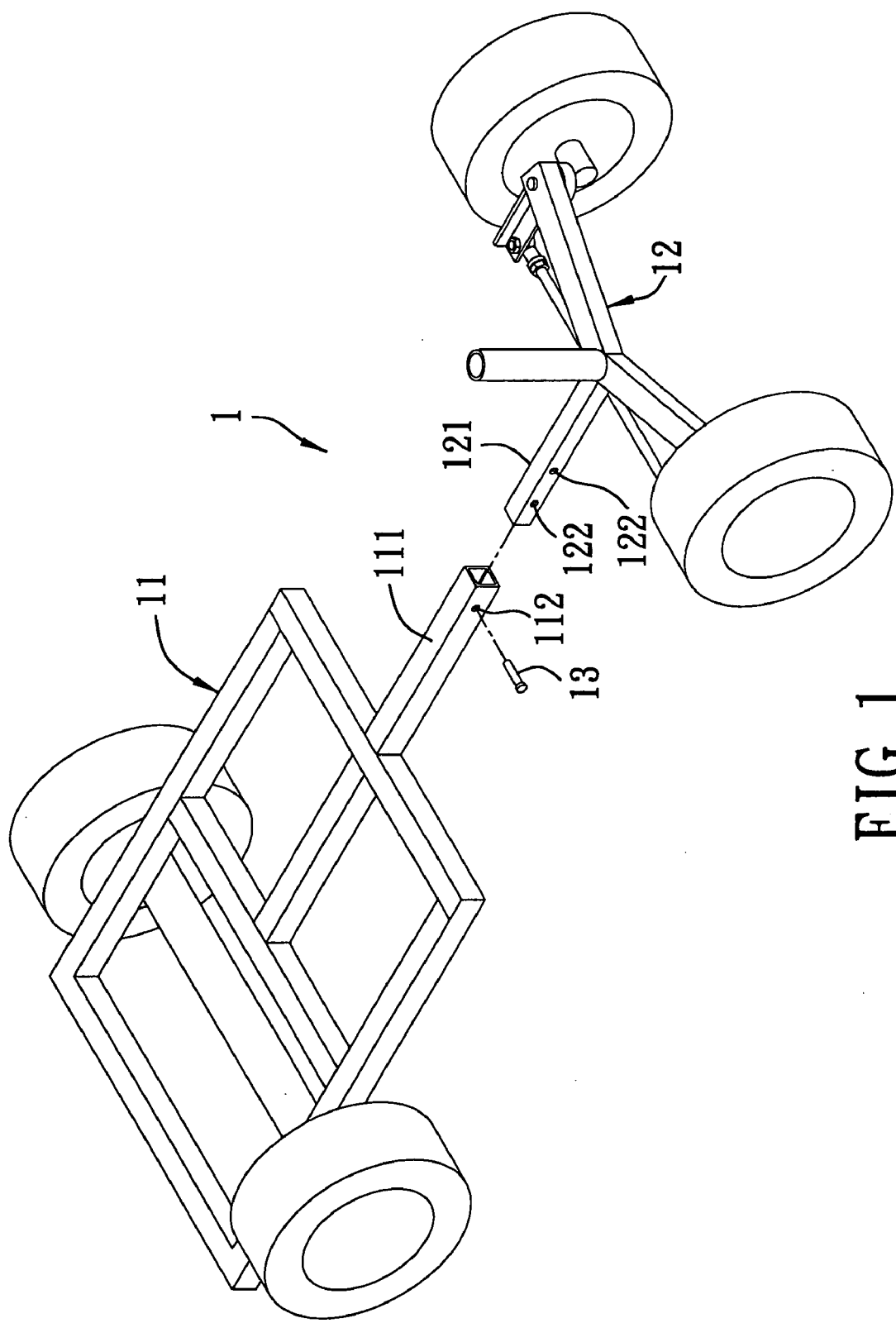
FIG. 1 is a fragmentary, partly exploded perspective view of a conventional motor-driven vehicle.
Figure 2:
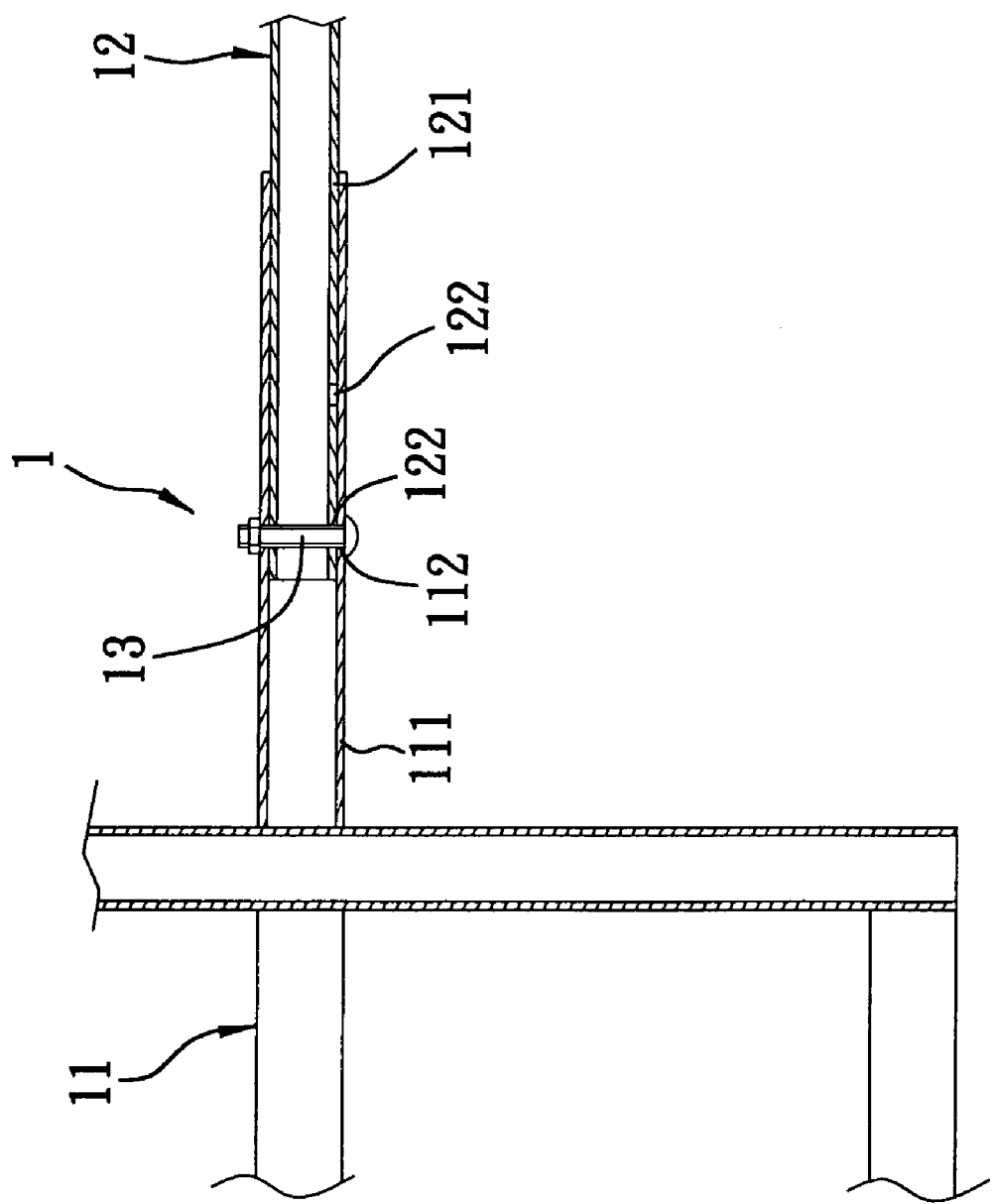
FIG. 2 is a schematic sectional view illustrating a connection between a sleeve tube and an insert rod of the conventional motor-driven vehicle.
Figure 3:
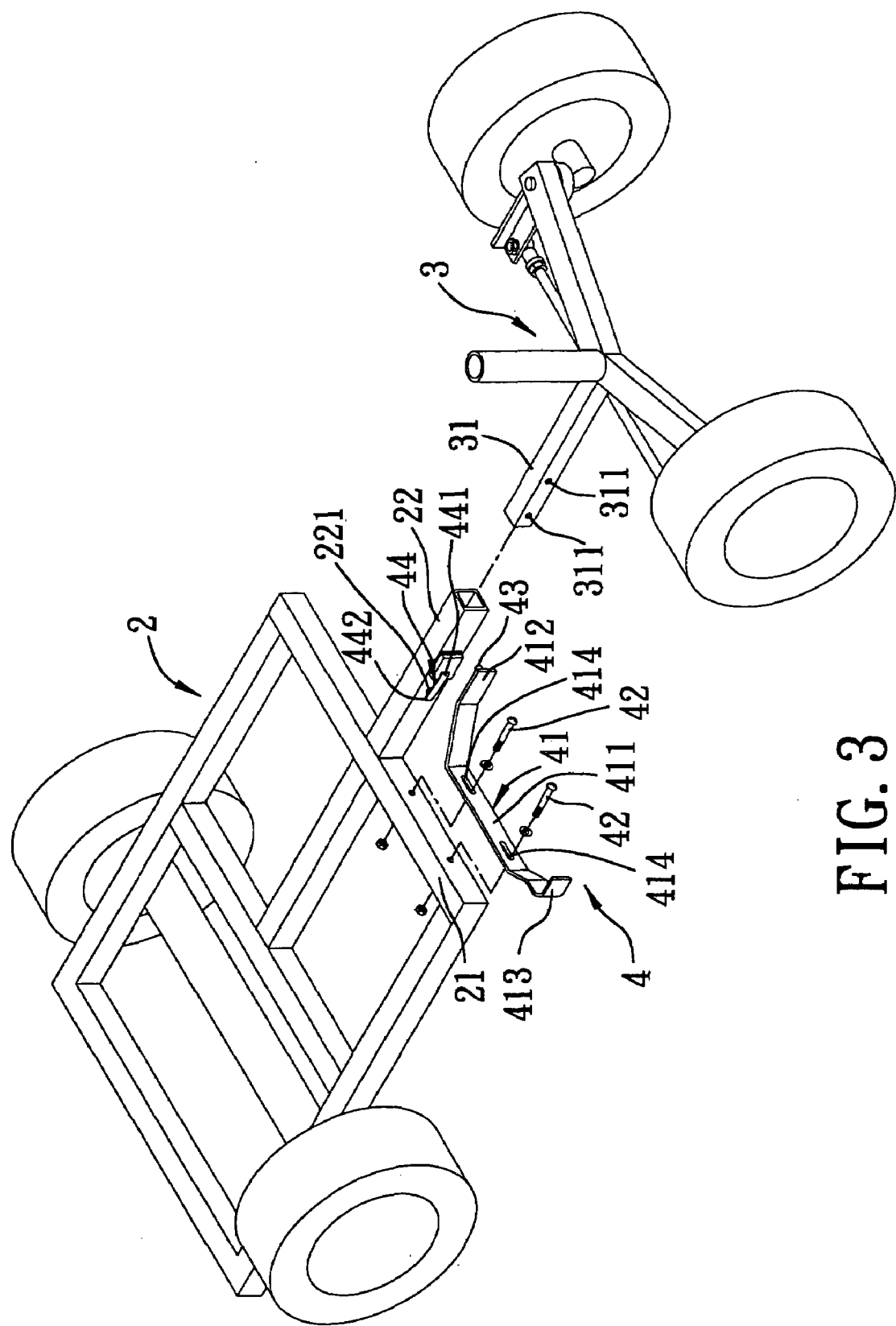
FIG. 3 is a fragmentary, partly exploded perspective view of the preferred embodiment of a motor-driven vehicle according to this invention.
Figure 4:
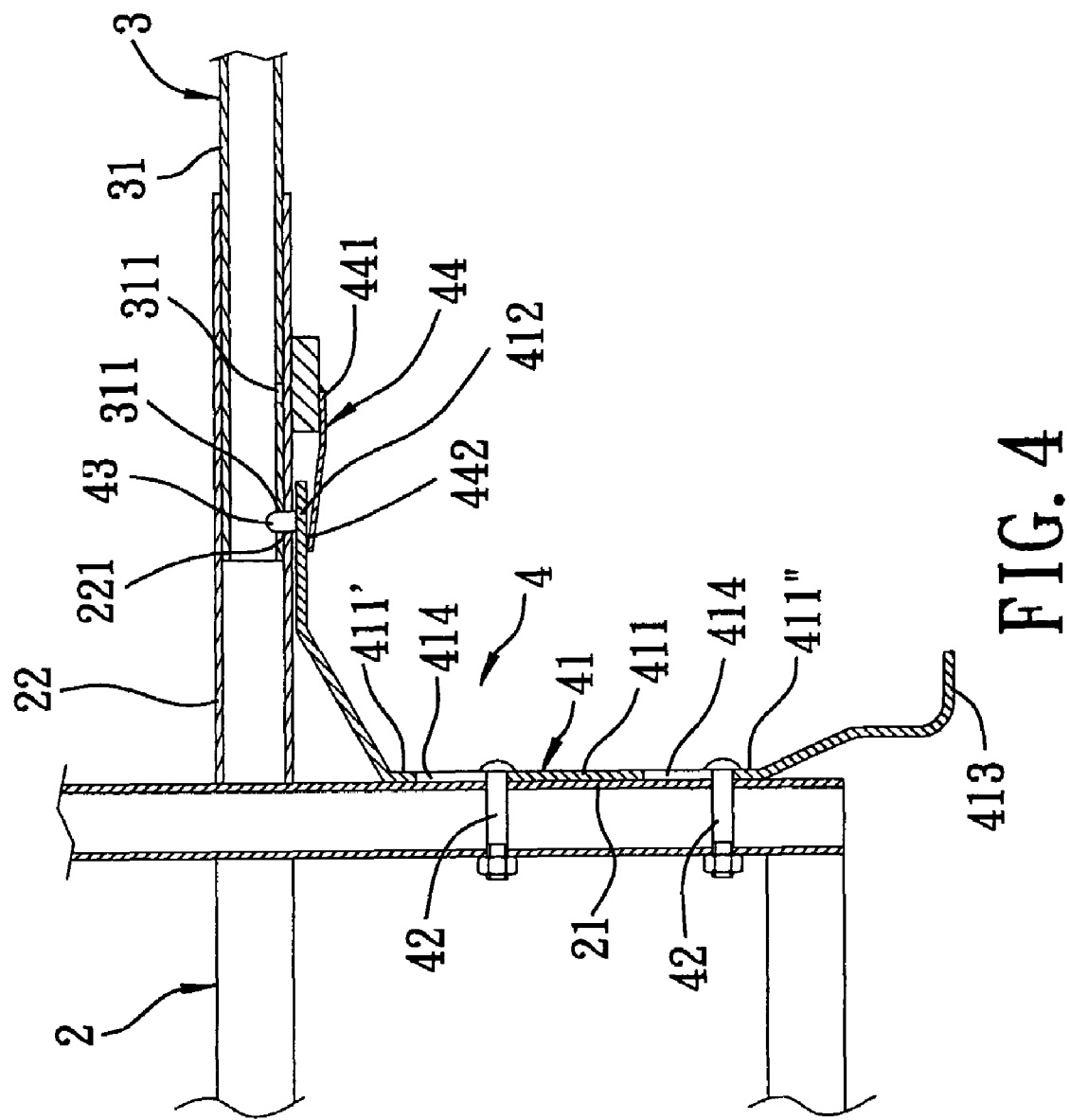
FIG. 4 is a schematic sectional view illustrating a locking position of a pull rod of the preferred embodiment.

Referring to FIGS. 3 and 4, the preferred embodiment of a motor-driven vehicle according to this invention includes a first vehicle body 2, a second vehicle body 3 disposed in front of the first vehicle body 2, and a locking device 4 for interlocking the first and second vehicle bodies 2, 3.

The first vehicle body 2 includes a front rod 21 disposed at a front end of the first vehicle body 2, and a sleeve tube 22 extending horizontally and forwardly from the center of the front rod 21. The sleeve tube 22 is formed with a hole 221.

The second vehicle body 3 includes a hollow insert rod 31 disposed telescopically within the sleeve tube 22. The insert rod 31 is formed with two spaced-part holes 311 that are aligned along a longitudinal direction of the insert rod 31.

The locking device 4 includes a pull rod 41, two position-limiting members 42, a retaining block 43 and a resilient member 44. The pull rod 41 is disposed movably on the first vehicle body 2. The retaining block 43 is disposed fixedly on the pull rod 41, and is aligned with the hole 221 in the sleeve tube 22 of the first vehicle body 2.

The pull rod 41 includes a mounting portion 411, a hanging portion 412 and an operable portion 413. The mounting portion 411 is disposed movably on a vertical rear surface of the front rod 21 of the first vehicle body 2, and is configured as a plate that extends perpendicular to the sleeve tube 22. The mounting portion 411 is formed with two aligned slide slots 414 extending perpendicular to the sleeve tube 22. The position-limiting members 42 extend respectively through the slide slots 414 in the mounting portion 411, and are connected fixedly to the first vehicle body 2. Therefore, the movable distance of the pull rod 41 is limited. The mounting portion 411 is movable on the first vehicle body 2 along a direction perpendicular to the sleeve tube 22, and has an inner end 411' proximate to the sleeve tube 22, and an outer end 411" distal from the sleeve tube 22. The hanging portion 412 extends integrally from the inner end 411' of the mounting portion 411, and has an inner surface facing the sleeve tube 22, and an outer surface opposite to the inner surface. The retaining block 43 is disposed fixedly on the inner surface of the hanging portion 412. The resilient member 44 is configured as a reed spring, and has a fixed end 441 connected fixedly to the sleeve tube 22, and a pressing end 442 pressing against the outer surface of the hanging portion 412. As such, the retaining block 43 is pressed toward the hole 221 in the sleeve tube 22. The operable portion 413 extends integrally from the outer end 411" of the mounting portion 411, and is disposed at a right side of the first vehicle body 2. This increases convenience during operation of the pull rod 41.

Figure 5:
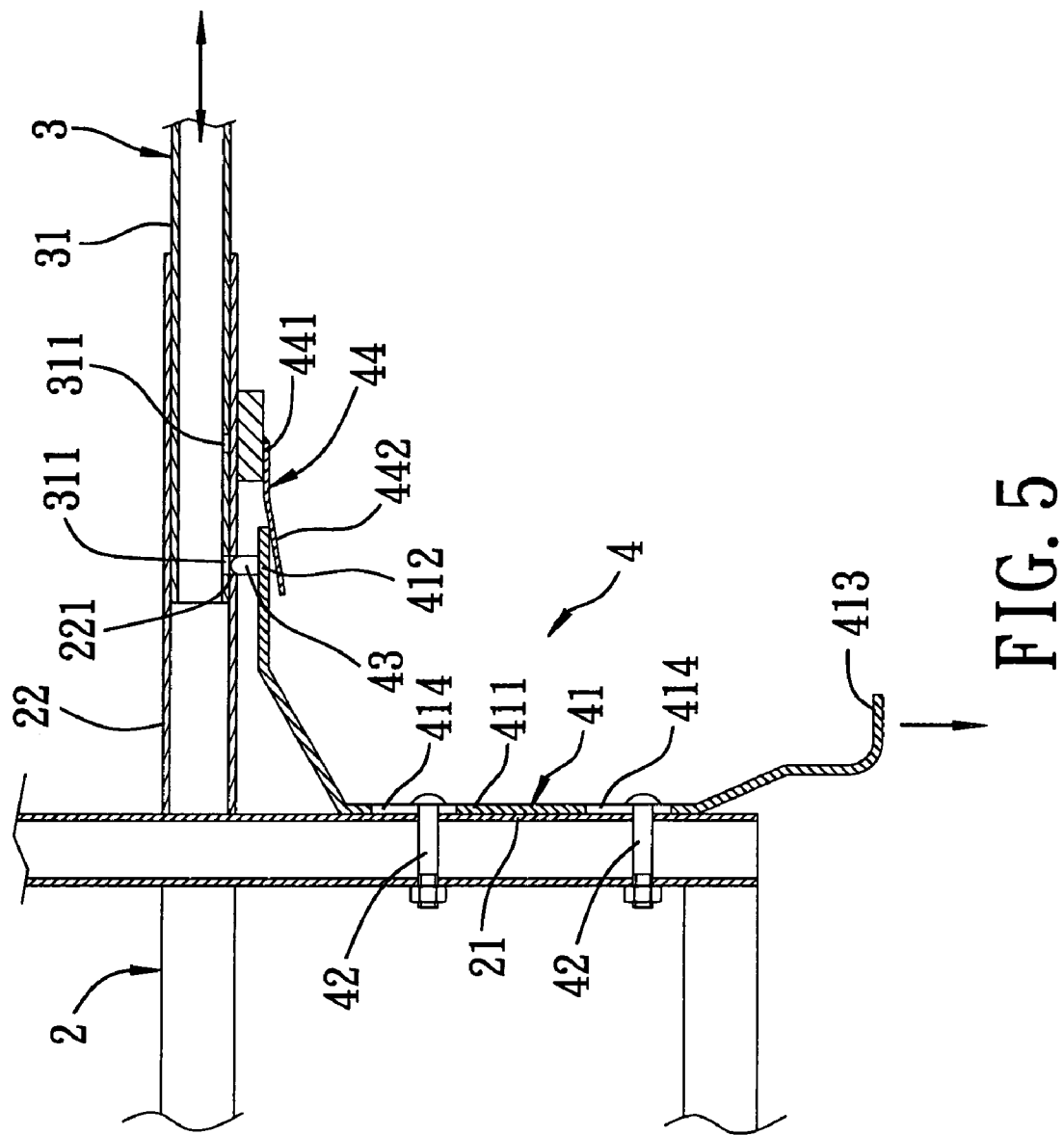
FIG. 5 is a schematic sectional view illustrating a release position of the pull rod of the preferred embodiment.

The pull rod 41 is movable on the first vehicle body 2 between a locking position shown in FIG. 4 and a release position shown in FIG. 5. When the pull rod 41 is disposed at the locking position, the retaining block 43 extends through the hole 221 in the sleeve tube 22, and engages a selected one of the holes 311 in the insert rod 31. This prevents relative movement between the first and second vehicle bodies 2, 3. When the pull rod 41 is disposed at the release position, the retaining block 43 is removed from the holes 311 in the insert rod 31. This allows for relative movement between the first and second vehicle bodies 2, 3. The resilient member 44 biases the pull rod 41 to the locking position.

During assembly or disassembly of the first and second vehicle bodies 2, 3, the pull rod 41 can be pulled outwardly to the release position against the biasing action of the resilient member 44 just before the insert rod 31 is moved within the sleeve tube 22. After the insert rod 31 is moved within the sleeve tube 22, the pull rod 41 is released. This allows the pull rod 41 to be biased by the resilient member 44 to the locking position.

Because the pull rod 41 is attached to the first vehicle body 2, and because the operable portion 413 of the pull rod 41 is disposed at the right side of the first vehicle body 2, connecting and disconnecting processes of the first and second vehicle bodies 2, 3 can be performed easily and conveniently. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A motor-driven vehicle comprising:
    a first vehicle body including a sleeve tube that is formed with a hole;
    a second vehicle body including an insert rod that is disposed telescopically within said sleeve tube of said first vehicle body and that is formed with a longitudinal row of spaced-apart holes; and
    a locking device including
        a pull rod disposed movably on said first vehicle body and movable on said first vehicle body between a locking position and a release position,
        a retaining block disposed fixedly on said pull rod and aligned with said hole in said sleeve tube of said first vehicle body, said retaining block extending through said hole in said sleeve tube and engaging a selected one of said holes in said insert tube of said second vehicle body so as to prevent relative movement between said first and second vehicle bodies when said pull rod is disposed at said locking position, said retaining block being removed from said holes in said insert rod so as to allow for relative movement between said first and second vehicle bodies when said pull rod is disposed at said release position, and
        a resilient member for biasing said retaining block to said locking position.

2. The motor-driven vehicle as claimed in claim 1, wherein said first vehicle body has left and right sides, said pull rod including:
    a mounting portion disposed movably on said first vehicle body and movable on said first vehicle body along a direction perpendicular to said sleeve tube, said mounting portion having an inner end proximate to said sleeve tube, and an outer end distal from said sleeve tube;
    a hanging portion extending integrally from said inner end of said mounting portion, said retaining block being disposed fixedly on said hanging portion; and
    an operable portion extending integrally from said outer end of said mounting portion and disposed at one of said left and right sides of said first vehicle body.

3. The motor-driven vehicle as claimed in claim 2, wherein said mounting portion of said pull rod is formed with two aligned slide slots extending perpendicular to said sleeve tube, said locking device further including two position-limiting members that extend respectively through said slide slots in said mounting portion of said pull rod and that are connected fixedly to said first vehicle body.

4. The motor-driven vehicle as claimed in claim 2, wherein said hanging portion of said pull rod has an inner surface facing said sleeve tube, and an outer surface opposite to said inner surface, said retaining block being disposed on said inner surface of said hanging portion of said pull rod, said resilient member being configured as a reed spring and having a fixed end connected fixedly to said sleeve tube, and a pressing end pressing against said outer surface of said hanging portion of said pull rod.

* * * * *